Sept. 20, 1938.  K. PATZWALDT  2,130,704
SOUND PERMEABLE PICTURE PROJECTION SCREEN AND METHOD OF MAKING SAME
Filed Dec. 16, 1936
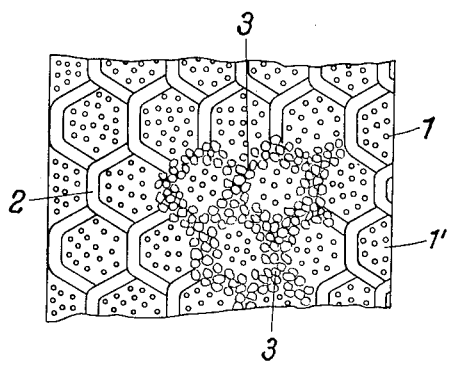
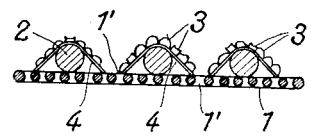
Inventor:
Karl Patzwaldt
By Sommers & Young
Attys Patented Sept. 20, 1938

2,130,704

UNITED STATES PATENT OFFICE 2,130,704

SOUND PERMEABLE PICTURE PROJECTION SCREEN AND METHOD OF MAKING SAME

Karl Patzwaldt, Gladbach-Rheydt, Germany

Application December 16, 1936, Serial No. 116,216
In Germany October 11, 1934

5 Claims. (Cl. 88—24)

This invention relates to a projection screen for exhibiting cinematograph pictures with a sound accompaniment said screen having pores for the passage of sound, and aims at improving such a screen in both the acoustical and the optical respects.

Projection screens are already known in the smooth material of which pores are formed for the passage of sound. On the other hand, it has also already been suggested that non-porous projection screens should be provided with a patterned surface, that is to say, a surface divided into raised polygons, which gives good results from an optical point of view.

The present invention provides a projection screen advantageous for sound transmission, having a raised patterned surface with one or more pores at the base of each of its separate structural divisions. In this way the projection screen is not only made permeable to sound, but the manner in which the sound passes through the screen is facilitated and improved, since the structural divisions act as small horns for the sound-waves passing through the pores of the screen and thus amplify and uniformly distribute such sound-waves. At the same time the superiority of the patterned surface as compared with a smooth screen, from an optical point of view, is in no way affected by the pores at the base of the structural divisions.

The favourable optical effect of the screen of the present invention can be substantially increased and improved by coating the screen surface with fine, optically refracting or reflecting particles for example so-called crystal particles. If such particles be applied to a plain sound film screen provided with pores, there is a danger of the particles stopping up and blocking the pores, at least to a large extent. This danger can be avoided or very substantially minimized in accordance with the invention by applying the crystal refracting or reflecting particles to a porous screen having a patterned surface.

In such a screen, consisting of a pattern-forming open mesh fabric and a porous screen background, the refracting or reflecting particles can, moreover, be deposited solely on the front meshed fabric and in the horns formed by the meshes of the front fabric and the background material, while the pores in the background material are left free approximately in the center of the individual structural divisions. This can be achieved by a suitable method of spraying the adhesive serving to secure the refracting or reflecting particles to the screen, and also of spraying said particles on to the surface of the screen, namely by passing the spray-gun applying the adhesive over the screen at such an angle to the latter that the portion of the background material lying in the center of the various structural divisions of the front material is protected against the sprayed liquid, in the direction of the spray, by the threads of the pattern-forming open mesh fabric, so that such portion of the background remains practically free from refracting or reflecting particles.

In this way a projection screen is produced which, owing to the coating of fine particles of crystal, presents the most favourable optical properties obtainable, without loss of the acoustic advantages afforded by the porosity. The refracting or reflecting particles are deposited in the individual structural cells approximately over a surface sloping towards the porous background, and thus form in each cell a kind of concave reflector. This increases the lateral diffusion of the light reflected by the screen, and gives a diffuse, picture-softening light, and also illuminates the corners of the screen which would otherwise be darker, thus providing a practically uniformly bright picture. The powerful reflecting properties of this screen also make it particularly suitable for color films.

The manufacture of the porous projection screen of the present invention coated with refracting or reflecting particles presents no difficulties, inasmuch as by spraying at an angle it is possible to apply said particles in a simple and yet reliable manner without stopping up the pores in the screen and thus affecting the permeability to sound of the latter, and also to apportion exactly and distribute uniformly said particles on the surface of the screen. At the same time firm and lasting adherence of the refracting or reflecting particles to the screen, even when the latter is bent, rolled or folded, is ensured.

The optical effect of a porous screen coated with refracting or reflecting particles and having a patterned surface can be considerably enhanced by the use of particles having a flat, preferably concave or convex, form. In this way great lateral diffusion of light and uniform distribution of light illuminating the corners of the picture is achieved, whilst the lining of the structural cells in the form of concave reflectors with the pores in the background left unobstructed, is considerably facilitated. In addition the pictures shown on the screen are given a very favourable relief effect and an almost real stereoscopic illusion.

Moreover, it is advantageous to use a knitted material for the manufacture of the screen, as it is thus possible to make a seamless screen in a width that hitherto has not been possible when woven materials were used. The porous background material is advantageously joined to the pattern-forming top material by means of an adhesive that is permanently flexible, rubber solution being particularly suitable for this purpose. For the top material a fabric with regular interwoven openings, for example a Florentine tulle or other tulle fabric, can be used.

In order more clearly to understand the invention, reference is made to the accompanying drawing, which illustrates diagrammatically and by way of example one embodiment thereof, and in which Fig. 1 is a plan view, and Fig. 2 is a cross section, both on an enlarged scale.

The screen consists of the porous background 1 and the pattern-forming top fabric 2. The background consists of a porous fabric having a relatively close mesh, while the top 2 is a fabric having a honeycomb-shaped meshed structure. The background 1 and the top fabric 2 are joined together by an adhesive, for example by rubber solution, or by sewing. The double-ply screen thus formed is coated with refracting or reflecting particles 3, which are of flat form, being for example similar in shape to single or double convex or concave lenses. These refracting or reflecting particles 3 can consist of metal or glass beads, particularly of crystal glass beads, chromium-plated glass beads or metal beads polished to a high gloss.

The particles 3 are applied to the screen 1, 2 by being embedded in a coating of adhesive 4, consisting for example of a transparent resin varnish, which is applied by a spray-gun inclined to the surface of the screen in such a way that said adhesive leaves substantially unobstructed the pores 1' in the background 1 which lie in the center of the individual structural panels of the top fabric 2. Accordingly the particles 3 secured by the coating of adhesive 4 to the screen 1, 2 are embedded only in the pattern-forming meshed fabric 2 and in the horns formed by the meshes, of for example hexagonal shape, of this fabric 2 and the background 1, and leave unobstructed the pores 1' in the background which are approximately in the center of the various structural panels. They lie around these pores on a surface arched towards the background 1, and thus form, as it were, diminutive sound horns for the sound waves passing through these pores, and at the same time form a kind of small concave reflector for the incident light rays.

Having now particularly described and ascertained the nature of my said invention and in what manner the same is to be performed, I declare that what I claim is:

1. Sound-permeable projection screen for picture and sound films comprising two superposed and inter-connected fabrics, one of said fabrics having structure-forming, open, spaced mesh and the other fabric having relatively close mesh and being provided with relatively small pores or openings therethrough, the open mesh fabric being on the projection side of the close mesh fabric, a coating of adhesive material on the projection face of the screen covering the open mesh fabric and covering the close mesh fabric adjacent the meshes of the open mesh fabric and leaving uncoated areas of the close mesh fabric at the center portions of the openings of the open mesh fabric, and a coating of light dispersive particles adhered to said adhesive coating, whereby the pores of the close mesh fabric at the center portions of the openings of the open mesh fabric are left free of obstructions to sound transmission and the coating of particles forms funnel-like formations around said free center portions.

2. A screen according to claim 1, wherein the light dispersing particles have a flat globular form.

3. A screen according to claim 1 in which the light dispersive particles are light reflective.

4. A screen according to claim 1 in which the light dispersive particles are light refractive.

5. Method of manufacturing a sound permeable image projection screen having a formed surface provided with light dispersive particles thereon and free sound transmissive areas comprising securing an open, spaced mesh fabric in superposed relation on another fabric having a relatively close mesh and provided with small pores, with the open mesh fabric on the projection side of the close mesh fabric, spraying an adhesive material on the projection face of the combined fabrics in a direction inclined to the screen at such an angle that the close mesh fabric at the central portions of the openings of the open mesh fabric is shielded from the sprayed adhesive by the meshes of the open mesh fabric and left free of adhesive, applying solid light-dispersive particles to the projection side of the screen so that the particles adhere to the adhesive coated portions and not to the uncoated areas of the close mesh fabric, the pores of which are left open for sound transmission.

KARL PATZWALDT.